(12) United States Patent
Berstis

(10) Patent No.: US 6,229,526 B1
(45) Date of Patent: *May 8, 2001

(54) METHOD AND SYSTEM FOR SIMULTANEOUS OPERATION OF MULTIPLE HANDHELD IR CONTROL DEVICES IN A DATA PROCESSING SYSTEM

(75) Inventor: Viktors Berstis, Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,517

(22) Filed: Dec. 18, 1997

(51) Int. Cl.$^7$ .................. G09G 5/08; F16D 7/04
(52) U.S. Cl. .................. 345/158; 345/157; 345/161; 463/38; 463/39
(58) Field of Search .................. 345/158, 161, 345/157; 463/38, 39

(56) References Cited

U.S. PATENT DOCUMENTS

| | | | |
|---|---|---|---|
| 4,111,421 | 9/1978 | Mierzwinski | 273/85 |
| 4,390,877 | 6/1983 | Curran | 340/825 |
| 4,565,999 | 1/1986 | King et al. | 340/706 |
| 4,578,674 | 3/1986 | Baker et al. | 340/710 |
| 4,758,691 | 7/1988 | De Bruyne | 178/19 |
| 4,814,552 | 3/1989 | Stefik et al. | 178/18 |
| 4,924,216 * | 5/1990 | Leung | 340/709 |
| 4,988,981 | 1/1991 | Zimmerman et al. | 340/709 |
| 5,023,943 | 6/1991 | Heberle | 445/603 |
| 5,189,543 * | 2/1993 | Lin et al. | 359/142 |
| 5,288,078 * | 2/1994 | Capper et al. | 273/148 |
| 5,295,064 * | 3/1994 | Malec et al. | 364/401 |
| 5,317,752 | 5/1994 | Jewett et al. | 395/750 |
| 5,341,167 | 8/1994 | Guichard et al. | 348/14 |
| 5,421,303 * | 6/1995 | Baran | 348/10 |
| 5,423,227 | 6/1995 | Polaert et al. | 73/862.044 |
| 5,432,932 | 7/1995 | Chen et al. | 395/650 |
| 5,461,292 | 10/1995 | Zondio | 318/587 |
| 5,532,753 | 7/1996 | Buchner et al. | 348/569 |
| 5,554,980 | 9/1996 | Hashimoto et al. | 340/825.72 |
| 5,606,659 | 2/1997 | Maloy | 395/183.01 |
| 5,610,665 | 3/1997 | Berman | 348/564 |
| 5,621,435 * | 4/1997 | Krivacic | 345/145 |
| 5,677,909 * | 10/1997 | Heide | 270/347 |
| 5,854,624 * | 12/1998 | Grant | 345/169 |
| 5,877,745 * | 3/1999 | Beeteson et al. | 345/165 |

* cited by examiner

Primary Examiner—Richard A. Hjerpe
Assistant Examiner—Duc Dinh
(74) Attorney, Agent, or Firm—Jeffrey S. Labaw; David H. Judson; Duke W. Yee

(57) ABSTRACT

A method and system for controlling a display of a data processing system uses first and second wireless position control devices, and a control base unit. The first wireless position control device includes a transducer for transmitting a first signal upon which X-Y position control and/or action control signals generated by the device are imposed. A second wireless position control device includes a transducer for transmitting a second signal upon which X-Y position control and/or other action control signals generated by the second control device are imposed. The first and second signals and second different frequencies. To prevent the control devices from interfering with each other, the control base is associated with the data processing system and includes circuitry for issuing polling signals to the control devices. Only one of the control devices is polled at a particular time. The control base circuitry also receives and decodes the carrier signals to generate decoded display control signals. The display control signals are then used to drive the display device. Two users may thus control the display device simultaneously.

26 Claims, 4 Drawing Sheets

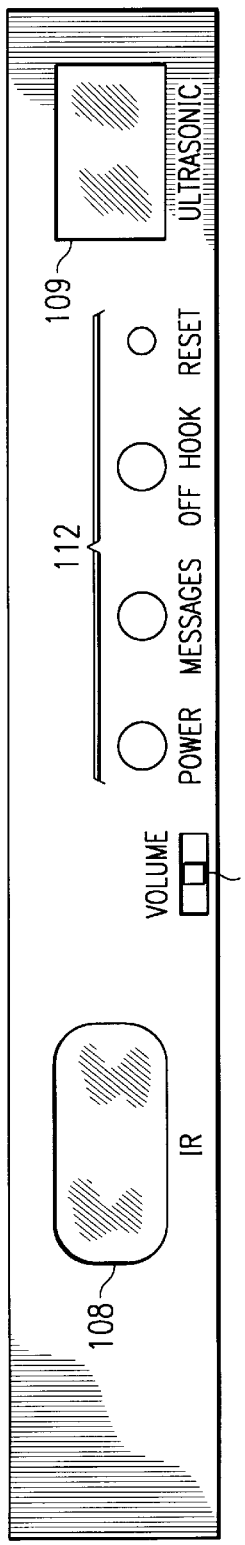
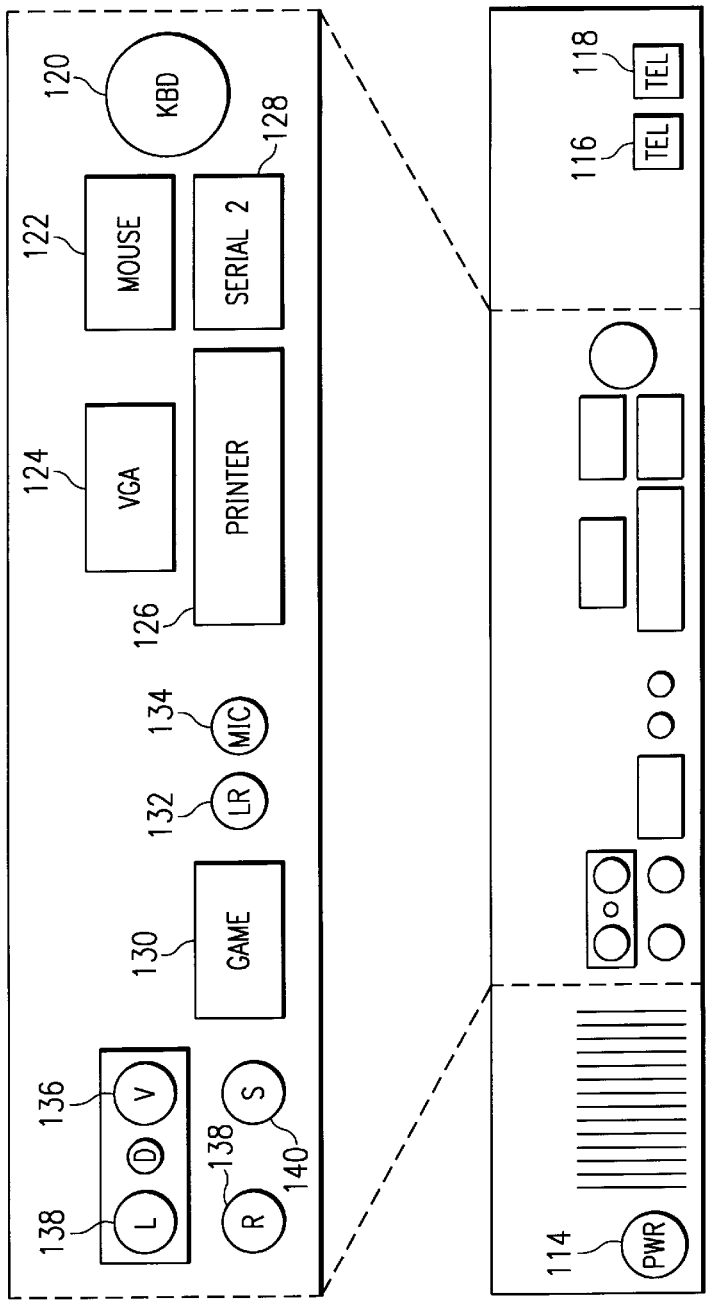
FIG. 1B
FIG. 1C

METHOD AND SYSTEM FOR SIMULTANEOUS OPERATION OF MULTIPLE HANDHELD IR CONTROL DEVICES IN A DATA PROCESSING SYSTEM

BACKGROUND OF THE INVENTION

1. Technical Field

The present invention relates in general to a method and system for data processing and in particular to an improved method and system of user interface to a data processing system. Still more particularly, the present invention relates to an improved method and system for simultaneous operation of multiple display control devices, such as a pair of joysticks.

2. Description of the Related Art

There has been great interest in providing Internet access at minimal economic cost. While most computers now are pre-configured for Internet access, a significant percentage of households still do not have a personal computer. Thus, it has now been proposed to provide a data processing system that, much like a VCR, may be connected to a television set and used in lieu of a personal computer to provide World Wide Web access through a conventional remote control device associated with the system unit. Such a system enables the television to become, in effect, a "Web" appliance. The viewer can rapidly switch between conventional television and Internet access using the remote control unit. All of the conventional "Internet" access tools and navigational functions are preferably "built-in" to the system and thus hidden to the user.

The remote control unit used to control the Web appliance is battery-powered and will typically include an infrared source, such as a light emitting diode (LED), which cooperates with a phototransistor in a receiver unit to effect the transfer of control signals for the appliance. An infrared control unit, however, is not easily adaptable for use in providing control of computer games, which use joysticks or glove control devices, because many of these games involve multiple players. In particular, multiple infrared remote devices interfere with each other when used in the same physical environment. This problem has sought to be addressed in the prior art by modifying the control units. Thus, for example, one approach to the problem of eliminating interference between control signals from multiple IR devices is to interlace control signals with quiescent periods during transmission. This technique is disclosed in U.S. Pat. No. 5,331,450. The control signals are received and validated by the receiver based on the quiescent periods. Another approach, illustrated in U.S. Pat. No. 4,313,227, assigns each control unit with a specific discrete carrier frequency. The receiver includes a switching circuit that is automatically controlled by a digital processor for selectively tuning the receiver to receive information from each control unit separately in a predetermined sequence.

Although these approaches enable the simultaneous use of a pair of infrared joystick devices, they requires specialized circuitry in each control unit as well as complex differentiation circuitry at the receiver. This is undesirable, especially in the context of a Web appliance, where it is a goal to reduce the complexity of the device as well as the machine interaction required by the user.

SUMMARY OF THE INVENTION

It is therefore a principal object of the present invention to provide a method and system for wireless display control in a personal computer.

It is still another principal object to provide a control system for computer games that includes at least a pair of wireless remote control devices adapted to be used by two (or more) people simultaneously and without interference.

It is a further object of the invention to enhance the control of a data processing system using wireless control devices that are selectively polled from a receiver to obtain control signals useful in controlling display screen objects on a display screen.

Another object of the present invention is to enhance the entertainment value of a computer system by obviating wired IR control devices.

Still another object of the invention is to provide a simple and cost-effective method for supporting use of multiple infrared control devices in a personal computer.

Yet another more general object is to provide an improved method and system of user interface within a data processing system.

These and other objects are provided in a system for controlling a display of a data processing system. The system comprises first and second wireless position control devices, such as a pair of joystick (or other input) controls, and a control base unit associated with a data processing system, such as a personal computer. The first wireless position control device includes an infrared device transmitter (e.g., a LED) for transmitting a first signal upon which X-Y position and/or other action control signals generated by the device are imposed. A second wireless position control device includes a transducer for transmitting a second signal upon which X-Y position and/or other action control signals generated by the second control device are imposed. The first and second signals may be the same frequency or may have different frequencies. To avoid interference, however, each of the wireless position control devices is normally in a non-transmitting mode of operation and is uniquely identified. Information from a particular control device is obtained by polling the device from a central control source, which is preferably the receiver used in the system. Thus, a particular control device only transmits information to the receiver for use in controlling the display device when it is requested to do so. The polling signals for each of the devices are separated temporally, and thus individual control devices do not interfere with each other even if the devices operate on the same or substantially the same carrier frequency.

In addition, if a particular control device is not being used or polled, its power supply may be reduced to a low power setting to conserve battery supply.

Thus, the control base associated with the data processing system includes appropriate circuitry for generating the polling signals, and for receiving and decoding the first and second signals to generate decoded X-Y position control signals and/or other action control signals. The decoded X-Y position control signals and/or the action control signals are then used to drive the display device. In particular, the position control and action control signals received from the first wireless position control device cause a first action and/or event on the display, while the position control and action control signals received from the second wireless position control device cause a second action and/or event on the display. The first and second actions or events facilitate the play of some multiplayer, interactive game or exercise.

In accordance with a more general aspect of the invention, a method of controlling a display of a data processing system is also provided. According to the method, first and second signals upon which control signals are imposed are selectively transmitted from respective first and second handheld, wireless control devices in response to respective polling signals. Preferably, a given polling signal uniquely identifies only a respective one of the control devices. Control information generated at the device is not transmitted until a polling signal for the device is received. When a polling signal for the particular device is received, the information is transmitted to the receiver, where it is then decoded and used to drive the display device (or some other program or program element).

In particular, the control signals from a particular control device include X-Y position control signals, action control signals, or both. At the receiver, the first and second signals (from the respective devices) are processed to generate display control signals. The display control signals are then used to drive a display device or other element of a data processing system. In this manner, a pair of users of the first and second wireless control devices may interact with each other without interference. To conserve energy, each of the control devices is battery-powered and is also placed in a "powered-down" mode of operation. The control device is awakened periodically (e.g., once per second) to sample the environment for control element changes and new polling signals.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1B is a pictorial representation of a front panel of the data processing system unit;

FIG. 1C is a pictorial representation of a rear panel of the data processing system unit;

DETAILED DESCRIPTION OF PREFERRED EMBODIMENT

A representative computer environment in which the present invention may be implemented is a "Web" appliance. At the outset, although the invention is illustrated in the context of a "Web" appliance, the features of the invention may be implemented in any data processing system, or even in a standalone gaming device, irrespective of the actual computer, network or other system environment.

Figure 1A:
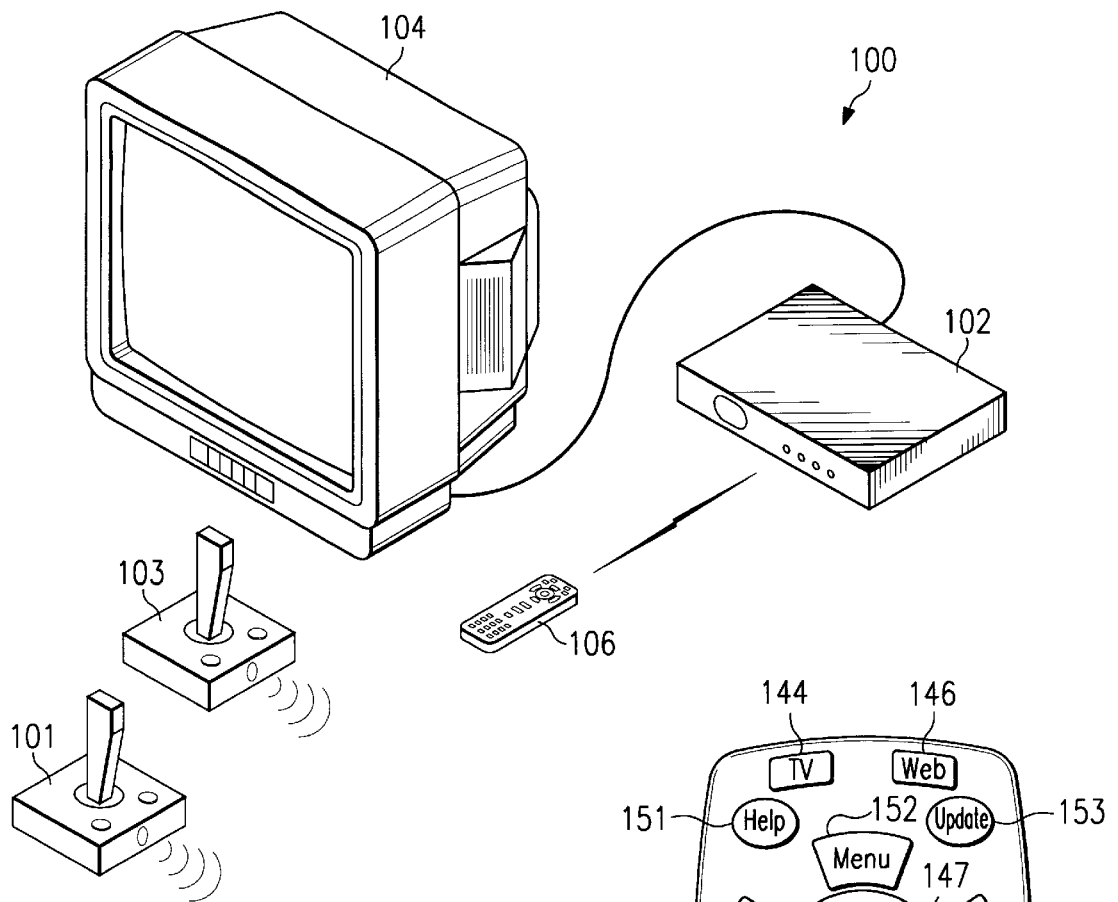
FIG. 1A is a pictorial representation of a data processing system unit connected to a conventional television set to form a "Web" appliance.

A representative data processing system or so-called "Web appliance" is illustrated in FIGS. 1A–1D and 4. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, which is conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated with a control code different than the codes used to control the normal television, stereo, and VCR infrared remote control devices, in order to avoid interference. Remote control unit 106 provides the functionality of a pointing device (such as a mouse, glidepoint, trackball or the like) in conventional personal computers, including the ability to move a cursor on a display and select items.

According to the present invention, and as seen in FIG. 1A, one or more wireless remote control devices 101 and 103 are also provided for use with the data processing system. Each of the remote control devices 101 and 103 generates control signals that are typically imposed on light signals. Preferably, the devices 101 and 103 use carrier signals in the infrared region. An exemplary carrier frequency is 38 khz. Each of the devices 101 and 103 may operate on the same carrier frequency, or on different carrier frequencies. Interference between the devices, however, is avoided by selectively actuating each of the devices at a different time using polling signals uniquely identifying the given devices, as will be described below.

FIG. 1B is a pictorial representation of the front panel of data processing unit 102. The front panel includes an infrared window 108 for receiving signals from remote control unit 106 and for transmitting infrared signals. The front panel also includes an infrared transducer window 109 for issuing polling signals to, and for receiving control signals from, one or more wireless control devices, as will be described below. Data processing unit 102 may transmit infrared signals to be reflected off objects or surfaces, allowing data processing unit 102 to automatically control television 104 and other infrared remote controlled devices. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

FIG. 1C is a pictorial representation of the rear panel of data processing unit 102. A three wire (ground included) insulated power cord 114 passes through the rear panel. Standard telephone jacks 116 and 118 on the rear panel provide an input to a modem from the phone line and an output to a handset (not shown). The real panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a wire connection for a joystick or other gaming control device (glove, etc.) although, as noted above and as described below, the front panel of the device includes the window 109 from which the polling signals are issued and to which the control signals from the control devices are received. Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown) If the user has S-Video input, then S-Video connection 140 may be used to connect to television 104 to provide a better picture than the composite signal. If television 104 has no video inputs, an external channel ¾ modulator (not shown) may be connected in-line with the antenna connection.

Figure 1D:
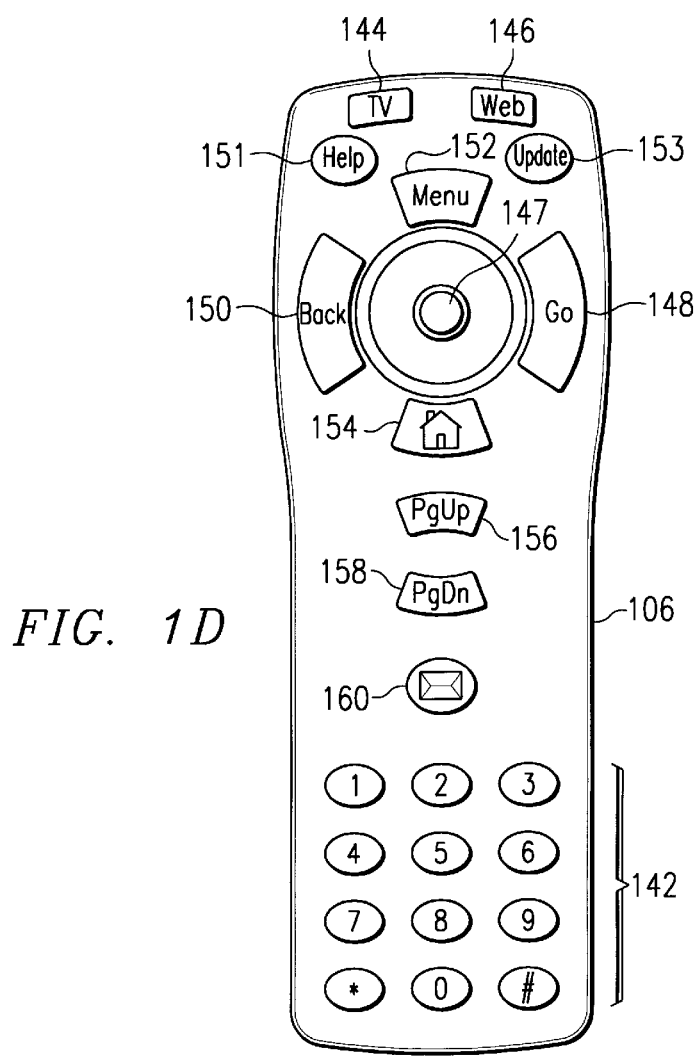
FIG. 1D is a pictorial representation of a remote control unit associated with the data processing system unit.

FIG. 1D is a pictorial representation of remote control unit 106. Similar to a standard telephone keypad, remote control unit 106 includes buttons 142 for Arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet or "off-line" browsing of the hard drive. For example, pressing "Web" button 146 will cause data processing unit 102 to initiate modem dial-up of the user's Internet service provider and display the start-up screen for an Internet browser.

A pointing device 147, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Help" button 151 causes context-sensitive help to be displayed or otherwise provided. "Menu" button 152 causes a context-sensitive menu of options to be displayed, and "Update" button 153 will update the options displayed based on the user's input, while home button 154 allows the user to return to a default display of options. "PgUp" and "PgDn" buttons 156 and 158 allows the user to change the context of the display in display-sized blocks rather than by scrolling. The message button 160 allows the user to retrieve messages.

In addition to remote control unit 106, an infrared keyboard (not shown) with an integral pointing device may be used to control data processing unit 102. The keyboard may communicate with the data processing unit via control commands impressed upon a carrier signal. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device may lock out all others until a prescribed period of inactivity has passed.

Figure 2:
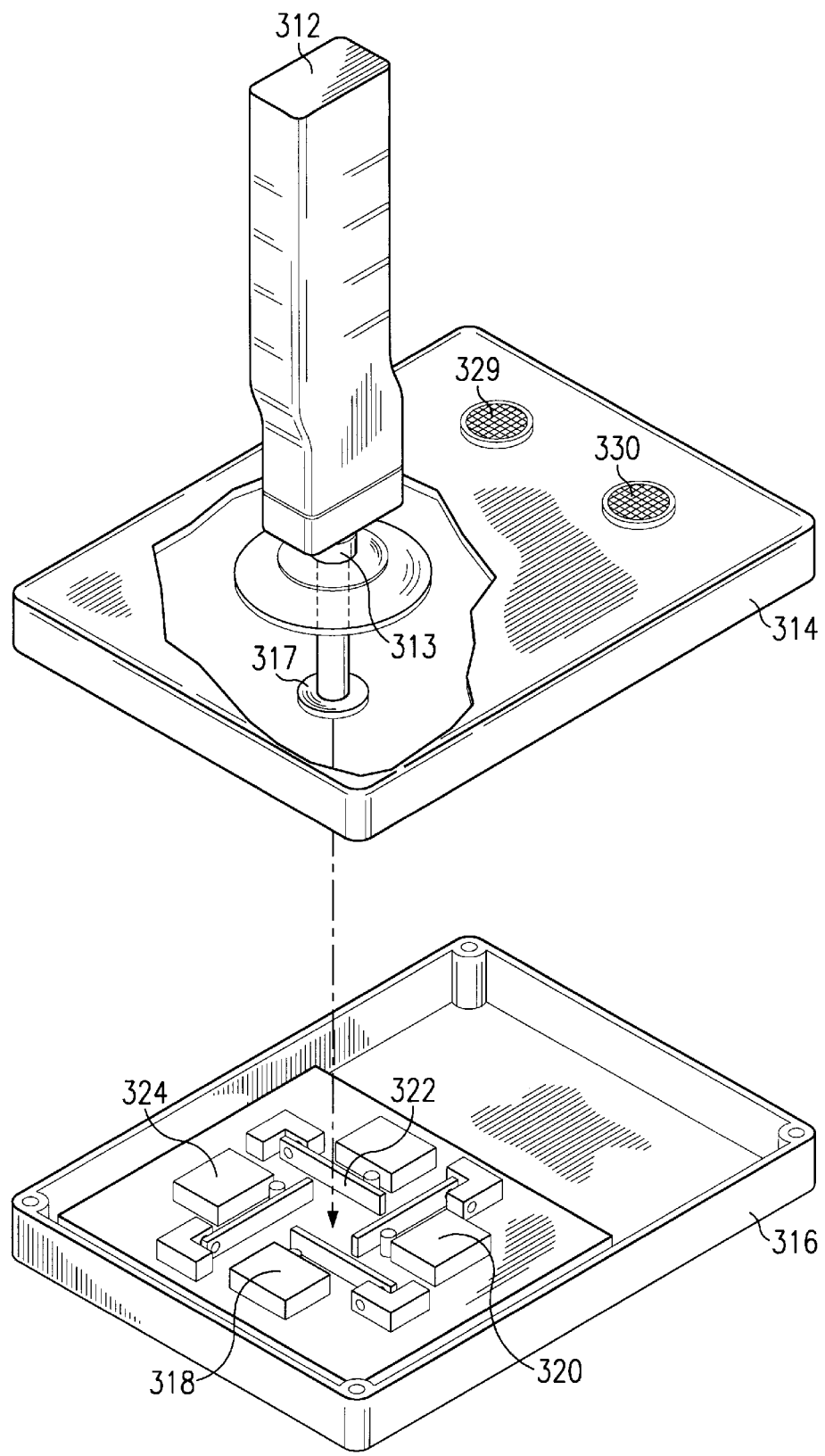
FIG. 2 is a perspective view, partially exploded, of one of the wireless joystick devices of the Web appliance.

As noted above, one or more wireless remote control devices 101 and 103 are provided for use with the data processing system. A representative wireless control device is a joystick, which is illustrated in simplified form in FIG. 2. As is well-known, a joystick is useful for inputting information into a computer or to control the movement of a figure or object in a video game. Joystick 310 includes a handle 312 pivotally mounted in a swivel 313 in an upper housing portion 314. The upper housing 314 is attached to a lower housing 316. The handle 312 facilitates manual input of coordinate information to the computer or video game with the handle being movable to a position in two orthogonal directions to control the input of such coordinate information. To this end, handle 312 is adapted to be manually manipulated to move or pivot in any direction about the swivel 313 to produce different movements of the control 317, which thus moves in an X-Y coordinate plane. When the handle is manipulated, control 317 makes contact with switches 318, 320, 322 and 324, to produce digital information. The switches are spaced 90 degrees apart, representing movement of the handle 312 in the +x, −x, +y and −y directions of the X-Y coordinate plane. Preferably, the actual joystick does not use physical "switch" devices such as represented in FIG. 2; rather, the joystick position is determined using a pair of variable resistors (or perhaps capacitors) set up in a gimbal mechanism. The two variable resistors measure the X and Y position of the joystick and generate X and Y values that are proportional to the joystick position in the X-Y plane. These latter signals are then sent to the computer. The joystick typically includes operator-actual firing buttons 329 and 330 which, when pressed, control or activate other switches which send signals to the computer or game to initiate an event. Buttons 329 and 330 thus generate action control signals for effecting an event or action on the display screen. Of course, the control device does not require the control handle to input position control information; any suitable device may be used for this purpose.

Figure 3:
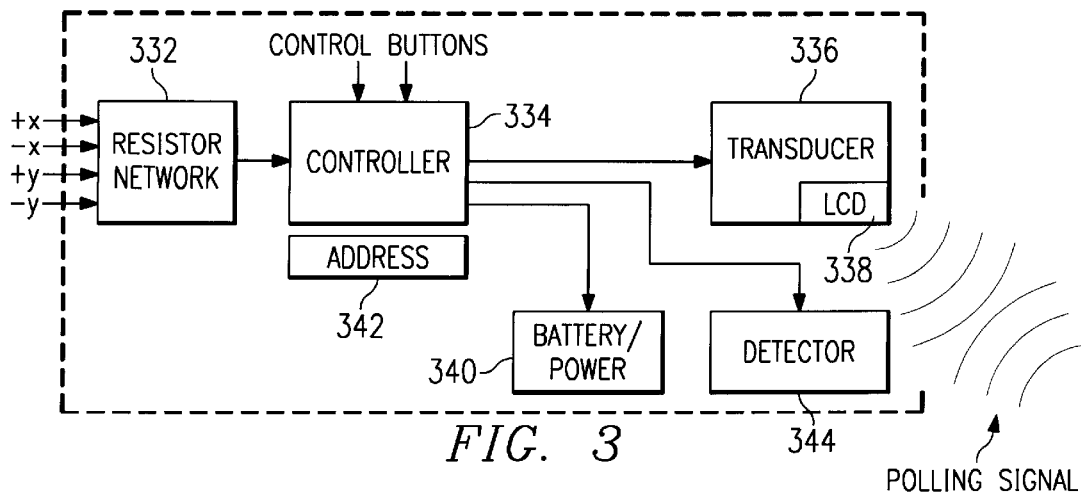
FIG. 3 is a schematic diagram of the electronic circuitry of the wireless joystick device of FIG. 2.

FIG. 3 is a simplified schematic diagram of the electrical circuitry of the joystick of FIG. 2. Resistor network 332 represents the pair of variable resistors discussed above. The resistor network output is supplied to a microcontroller 334, which also receives the outputs of the firing buttons 329 and 330. Circuit 334 may be any suitable device, such as a Microchip PIC16C58 microcontroller. It outputs a modulated pulse signal with a given number of bits (e.g., 12 bits) representing the X-Y position value and a given number of bits (e.g., 4 bits) representing the button values. Such control information is thus imposed on a carrier signal and output from the microcontroller. The pulse signal may also include a parity bit or other redundant data or strings to reduce noise susceptibility. The pulse signal is then supplied to an transducer circuit 336, which is used to drive a light emitting diode (LED) transducer 338. Microcontroller 334 preferably does not output the modulated pulse signal to the transducer circuit 336 until microcontroller receives a particular polling signal from detector circuit 344. In particular, detector circuit 344 generally responds to signals received by the control device and generates interrupts in the microcontroller. In response to an interrupt, the microcontroller analyzes the demodulated signals passed from the detector circuit to determine whether it is being polled. The microcontroller makes this determination by determining whether the address signals passed by the detector "match" its own address as set by address circuit (e.g., dip switches, solder inputs, or the like) 342. If microcontroller does not recognize its address, the polling (or other signal) is ignored, and thus the pulse signal (which includes the current X-Y position and button values) is not passed to the transducer circuit.

If, however, the microcontroller recognizes that it is being polled, the control information drives the LEDs 338, which causes the current X-Y position and button value information to be selectively transmitted to the receiver for controlling the display device. Although not shown in detail, it should be appreciated that transducer and detector circuits 336 and 344 may be the same or distinct.

In a preferred embodiment, the control device includes a suitable battery and associated circuitry 340 for powering the device. Microcontroller 334 also includes a low power mode for powering the control device into the "low-power" mode of operation. Preferably, the device is programmed to "wake up" once every given time period (e.g., once per second); however, once awoken, the microcontroller checks to see whether there has been any change in the X-Y position and/or button values since a last test. That check, however, is carried out over an extremely short period of time (e.g., one (1) millisecond) to conserve against excessive battery drain. If there has been no change, the microcontroller (and thus the device) goes back to sleep until the next test (typically, one (1) second later). If, however, there has been a change in the X-Y position and/or button values since the last test, the device stays "awake" for a set period of time (e.g., 30–60 seconds) and waits for its polling signal. If the polling signal is received while the device is now fully awake, the microcontroller transfers the current X-Y position and button values. If, however, no polling signal is received within that set time period (e.g., the 30–60 second period), the device goes back to sleep.

In operation, manipulation of the joystick handle provides corresponding X-Y movement of a cursor, graphical pointer or other game display element on the display device which, in this case, is the television monitor. Alternatively, the display device is a conventional computer monitor. Likewise, actuation of a control button on the joystick causes some display element to change position and/or state. Typically, the joysticks 101 and 103 are used in conjunction with some program source, such as a computer game or other software application running on the machine.

The X-Y position control signals and the action control signals are impressed upon the carrier signal by the microcontroller and then passed to the LED transducer in response to the base unit polling the individual control device. A corresponding control device for use by another person operates in a similar manner, except that the device is preferably polled at a different time so that the pair of devices may be used simultaneously. Thus, a first control device is polled, after which the receiver then "waits" for a suitable response (e.g., the then-current X-Y position and button values). If no response is received within the window, the first control device has lost its opportunity to control the display device (until the next polling signal cycle). Thereafter, the second control device is polled, and the receiver opens a window to "wait" for a response. The polling signal cycle then starts over.

Thus, in accordance with the present invention, each of the wireless remote control devices includes microcontroller circuitry for responding to a polling signal directed specifically to that device. X-Y position and/or button value control information generated by the device is not transmitted unless a polling signal for the specific device is being received. Although the control information is effectively buffered in the microcontroller, the "response" time seen by the user on the display device is not impaired because the information is not retained long enough as to delay its ultimate transfer to the receiver. Each of the pair of control devices is thus polled many times per second (but not simultaneously) so that, from the perspective of the pair of users, the devices are used simultaneously to control graphical elements on the display.

Preferably, the microcontroller in each device generates an infrared carrier, although this is not a requirement of the invention. Thus, one of ordinary skill in the art will appreciate that the joystick devices 101 and 103 may be used by two players simultaneously in order to effect changes to the display without interference with each other or with any infrared signals generated by the remote control unit 106.

Figure 4:
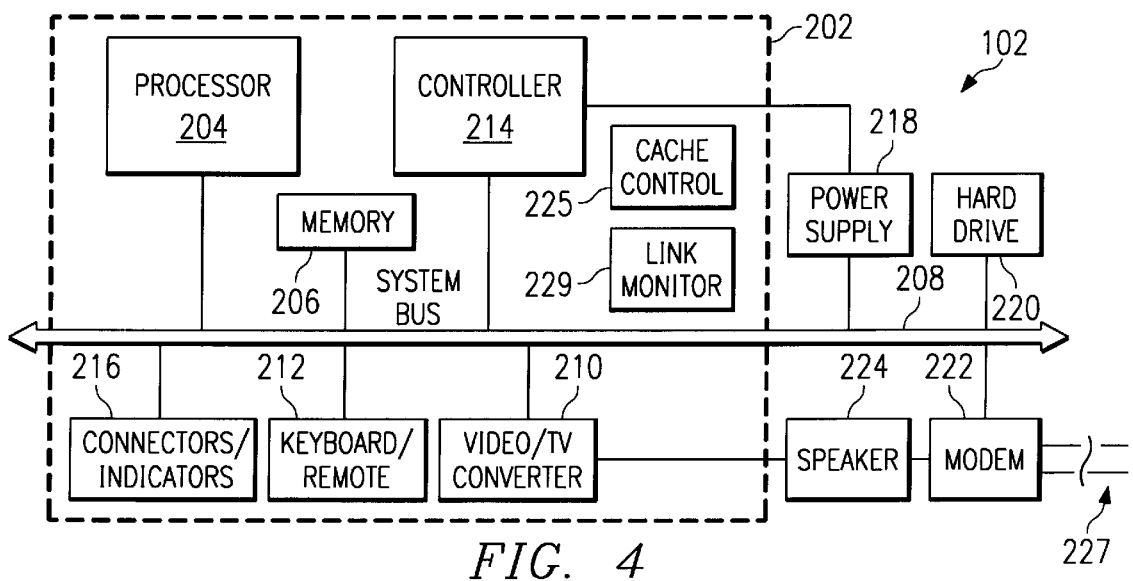
FIG. 4 depicts a block diagram of the system unit of the data processing system illustrated in FIG. 1.
Figure 5:
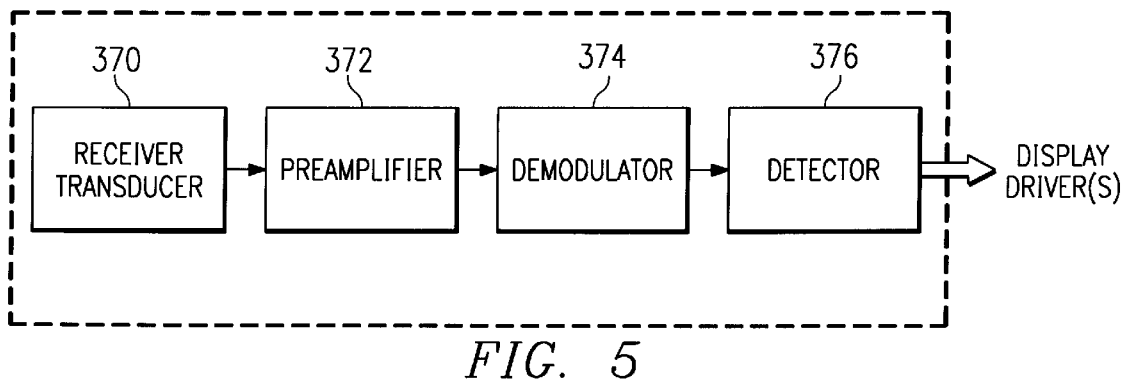
FIG. 5 is a block diagram of the receiver circuitry of the data processing system for use in receiving the control signals generated by the pair of wireless joystick devices.

Referring now to FIG. 4, a block diagram for the major components of data processing unit 102 is portrayed. As with conventional personal computers, data processing unit 102 includes a motherboard 202 containing a processor 204 and memory 206 connected to system bus 280. Processor 205 is preferably at least a 486 class processor operating at or above 100 MHz. Memory 206 may include cache memory and/or video RAM. Processor 205, memory 206, and system bus 208 operate in the same manner as corresponding components in a conventional data processing system.

Video/TV converter 210, located on motherboard 202 and connected to system bus 208, generates computer video signals for computer monitors, a composite television signal, and an S-Video signal. The functionality of Video/TV converter 210 may be achieved, for example, through a Trident TVG9685 video chip in conjunction with an Analog Devices AD722 converter chip. Video/TV converter 210 may require loading of special operating system device drivers.

Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the function provided by an infrared keyboard.

Connectors/indicators 216 on motherboard 202 provide some of the connections and indicators on data processing unit 102 described above. Other connections are associated with and found on other components. For example, telephone jacks 116 and 118 are located on modem 222. The power indicator within connectors/indicators 216 is controlled by controller 214.

External to motherboard 202 in the depicted example are power supply 218, hard drive 220, modem 222 and speaker 224. Power supply 218 is a conventional power supply except that it receives a control signal from controller 214 which effects shut down of all power to motherboard 202, hard drive 220 and modem 222. In some recovery situations, removing power and rebooting is the only guaranteed method of resetting all of these devices to a known state. Thus, power supply 218, in response to a signal from controller 214, is capable of powering down and restarting data processing unit 102.

Controller 214 is preferably one or more of the 805x family controllers. Controller 214 receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use. Controller 214 is thus used to generate the control device polling signals. As part of the failure recovery system, controller 214 specifies the boot sector selection during any power off-on cycle.

Hard drive 220 contains operating system and applications software for data processing unit 102, which preferably includes IBM DOS 7.0, a product of International Business Machines Corporation in Armonk, N.Y.; an operating system 221 such as Windows 3.1 (or higher), a product of Microsoft Corporation in Redmond, Wash.; and a browser 223 such as Netscape Navigator (Version 1.0 or higher), a product of Netscape Communications Corporation in Mountain View, Calif. Software on the hard drive 220 may also support an SMTP mechanism to provide electronic mail, an FTP mechanism to facilitate file transfers from Internet FTP sites, and other TCP/IP mechanisms, all in a known manner. Of course, the software identified above is merely representative, as other known programs may be used in the alternative or by way of addition.

Modem 222 may be any suitable modem used in conventional data processing systems, but is preferably a 33.6 kbps modem supporting the V.42bis, V.34, V.17 Fax, MNP 1–5, and AT command sets. To maintain the slim height of data processing system 102, modem 222 is preferably inserted into a slot mounted sideways on motherboard 202. Modem 222 is connected to a physical communication link 227, which, in turn, in connected or connectable to the Internet (not shown).

As noted above, data processing unit also includes circuitry for receiving/decoding the control signals generated by the control devices 101 and 103. Polling signals, as noted above, are preferably generated by controller 214.

Preferably, the receiver includes infrared transducer circuit 370 that drives a preamplifier 372. The infrared signals received by the transducer are converted to electrical waveforms, amplified by preamplifier 372, and then supplied to filter/demodulator 374. Filter/demodulator 374 is tuned to the carrier frequency of the control devices. (If each control device operates on a different carrier frequency, then a pair of filters is required.) Filter/demodulator 374 removes the carrier signal. The output is then passed through a decoder circuit 376 to generate the decoded display control signals used to control the display device. The decoder circuit, which is preferably part of the controller 214 (of FIG. 4), is selectively controlled to generate display control signals from either the first control device 101, of from the second control device 103, and so on, depending on the particular polling signal generated. Thus, for example, when the first polling signal is generated, the decoder circuit is set to generate first display control signals. Then, when the second control signal is generated, the decoder circuit is set to generate second display control signals.

One of ordinary skill will appreciate that the various receiver circuits, or any of them, may be implemented in whole or in part in hardware or in software.

Those skilled in the art will further recognize that the components depicted in FIGS. 1A–1D and described above may be varied for specific applications or embodiments. Such variations in which the present invention may be implemented are considered to be within the spirit and scope of the present invention. Thus, for example, the data processing system may be a personal computer such as a desktop or notebook computer, e.g., an IBM® or IBM-compatible machine running under the OS/2® operating system, an IBM ThinkPad® machine, or some other Intel x86 or Pentium®-based computer running Windows 3.1 or greater operating system.

It should thus be appreciated that the present invention provides many useful advantages. By using a pair of wireless control devices, the number of control connectors and the like is reduced, thus making the use of the Web appliance far more practical and enjoyable for inexperienced computer users. The wireless control devices preferably operate using infrared light but the devices are selectively powered down when not in use, and thus they consume far less power than conventional infrared control devices.

The control devices advantageously use existing infrared-type electronics, but the infrared elements (LED's and phototransistors) are only powered up fully when there has been a change of state in the joystick or button controls and a polling signal is addressing the particular device. Thus, the LED's are only driven when needed. Significant battery drain is thus avoided.

Of course, one of ordinary skill will recognize that the inventive system need not be limited to merely a pair of handheld wireless devices. The system may include a plurality of such handheld devices, each selectively activated using a polling signal generated from the receiver. Some of the plurality of devices may be joysticks, while still others are different types of control devices such as gaming gloves, pointing devices, mice, etc. Thus, the inventive techniques may be useful in facilitating simultaneous multi-user control of a display device in the context of more than just two participants. Moreover, there is no requirement that the present invention be implemented merely as a game control system, as the display device and associated control devices may be used for any purpose where it is required or desired to control display of and/or provide interactive information to multiple users. Thus, the invention has many other applications, e.g., for interactive sampling, audience participation, polling and the like, and any other uses where it is desired to provide multiple user interaction with a display device.

Another application of the present invention would be to play interactive games over a computer network, such as the Internet or World Wide Web. Once the data processing system described above were connected to such a network, interactive game display information would be downloaded from a server. One or more players would then use the wireless control devices in the manner described to manipulate one or more game elements, preferably as the active connection over the network is maintained. One user be located at one computer and play a second user located at a second computer.

While the invention has been particularly shown and described with reference to a preferred embodiment, it will be understood by those skilled in the art that various changes in form and detail may be made therein without departing from the spirit and scope of the invention.

What is claimed is:

1. A system for controlling a display of a data processing system, comprising:

a first wireless input device including means responsive to receipt of a first polling signal for transmitting a first signal upon which first signals are imposed;

a second wireless input device including means responsive to receipt of a second polling signal for transmitting a second signal upon which second control signals are imposed;

a receiver including means for alternately generating the first and second polling signals such that, in response to either of the first and second polling signals, only one of the first and second signals is transmitted from either of the first or second wireless input devices to the receiver at any time and means responsive to receipt of the first and second signals for generating fist and second display control signals; and means responsive to the first and second display control signals for controlling the display.

2. The system as described in claim 1 wherein at least the first input device is a joystick.

3. The system as described in claim 2 wherein the first control signals include X-Y position control signals for controlling an X-Y position of a screen element on the display device.

4. The system as described in claim 3 wherein the first control signals include action control signals for effecting an event on the display device.

5. The system as described in claim 2 wherein the second wireless input device is a joystick.

6. The system as described in claim 5 wherein the first and second input devices are battery-powered.

7. The system as described in claim 1 wherein the means for transmitting of the first wireless input device is a light emitting diode.

8. The system as described in claim 1 wherein the first and second signals have the same frequency.

9. The system as described in claim 1 wherein the first and second polling signals are generated by the receiver at first and second times.

10. A system for enabling first and second users to control a display of a data processing system simultaneously, comprising:

a first wireless joystick including means responsive to receipt of a first polling signal for transmitting a first signal upon which first signals are imposed;

a second wireless joystick including means responsive to receipt of a second polling signal for transmitting a second signal upon which second control signals are imposed;

circuit means for alternately generating the first and second polling signals such that, in response to either of the first and second polling signals, only one of the first and second signals is transmitted from either of the first or second wireless input devices to the receiver at any time and means responsive to receipt of the first and second signals for generating fist and second display control signals; and means responsive to the first and second display control signals for controlling the display.

11. The system as described in claim 10 wherein the first control signals include X-Y position control signals for controlling an X-Y position of a screen element on the display device.

12. The system as described in claim 11 wherein the first control signals include action control signals for effecting an event on the display device.

13. The system as described in claim 10 wherein the first and second wireless joysticks are battery-powered.

14. The system as described in claim 10 wherein the means for transmitting of the first wireless joystick is a light emitting diode.

15. The system as described in claim 10 wherein the first and second signals have the same frequency and the first and second polling signals have the same frequency.

16. The system as described in claim 15 wherein each of the first and second polling signals include control information uniquely identifying a selected one of the first and second wireless joysticks.

17. A method of controlling a display of a data processing system, comprising the steps of:

at a first time and responsive to a first polling signal, transmitting a first signal upon which first signals are imposed;

at a second time and responsive to receipt of a second polling signal, transmitting a second signal upon which second control signals are imposed, the first and second times being selected so that only one of the first and second signals is transmitted at any time;

receiving and decoding the first and second signals to generated decoded display control signals; and driving the display using the decoded display control signals.

18. The method as described in claim 17 wherein the first carrier signal is generated with a first wireless position control device.

19. The method as described in claim 17 wherein the second carrier signal is generated with a second wireless position control device.

20. The method as described in claim 17 wherein the first control signals include X-Y posit ion control signals for controlling an X-Y position of a screen element on the display device.

21. The system as described in claim 17 wherein the first control signals include action control signals for effecting an event on the display device.

22. A receiver for use in a display control system for controlling a display of a data processing system, the display control system including at least a pair of wireless control devices that generate respective first and second position control signals imposed upon first and second carrier signals, the receiver comprising:

means for issuing polling signals alternately to the pair of wireless control devices to request information from a respective one of the wireless control devices such that, in response to the polling signals, only one of the first and second carrier signals is transmitted from either of the wireless control devices to the receiver at any time;

means for receiving signals from the wireless control devices having the first and second position control signals imposed thereon;

signal processing means connected to the receiving means for generating first and second display control signals for controlling the display of the data processing system, the signal processing means, comprising:

means connected to the receiving means for generating the control signals; and decoder means connected to the demodulator means for receiving the control signals and generating the display control signals.

23. The receiver as described in claim 22 wherein the mean for receiving is a phototransistor circuit.

24. The receiver as described in claim 22 wherein the signal processing means includes a computer program executed by the data processing system.

25. A gaming system for use with a computer to enable first and second users of the gaming system to control a display of the computer simultaneously, comprising:

a first wireless joystick adapted to be held by the first user and including a transducer responsive to receipt of a first polling signal for transmitting a first signal upon which first signals are imposed;

a second wireless joystick adapted to be held by the second user and including a transducer responsive to receipt of a second polling signal for transmitting a second signal upon which second control signals are imposed; and circuit means for alternately generating the first and second polling signals such that, in response to either of the first and second polling signals, only one of the first and second signals is transmitted from either of the first or second wireless input devices to the receiver at any time and receiving and decoding the first and second signals from the first and second wireless joysticks and in response thereto generating fist and second display control signals for use in controlling the display of the computer.

26. A method of controlling a display of a data processing system connected to a computer network having a server, comprising the steps of:

establishing an active connection between the data processing system and the server;

downloading information to the data processing system to cause a first and second game elements to be output on the display;

having a first user of the data processing system use a first wireless control device that is responsive to a first polling signal for selectively transmitting a first signal upon which first control signals are imposed;

having a second user of the data processing system use a second wireless control device that is responsive to a second polling signal for selectively transmitting a second signal upon which second control signals are imposed;

alternately generating the first and second polling signals such that, in response to either of the first and second polling signals, only one of the first and second signals is transmitted from either of the first or second wireless input devices to the receiver at any time receiving and decoding the first and second signals to generate decoded first and second display control signals;

driving the display using the decoded first display control signals while the active connection is maintained to thereby manipulate the first game element; and driving the display using the decoded second display control signals while the active connection is maintained to thereby manipulate the second game element.

* * * * *

UNITED STATES PATENT AND TRADEMARK OFFICE
CERTIFICATE OF CORRECTION

PATENT NO. : 6,229,526 B1
DATED : May 8, 2001
INVENTOR(S) : Berstis

Page 1 of 1

It is certified that error appears in the above-identified patent and that said Letters Patent is hereby corrected as shown below:

Column 11,
Lines 11 and 52, "fist" should be -- first --.

Column 12,
Line 29, "posit ion" should be -- position --.
Line 61, "mean" should be -- means --.

Column 13,
Line 17, "fist" should be -- first --.

Signed and Sealed this

Fifth Day of March, 2002

Attest:

Attesting Officer

JAMES E. ROGAN
Director of the United States Patent and Trademark Office